Figure 1:
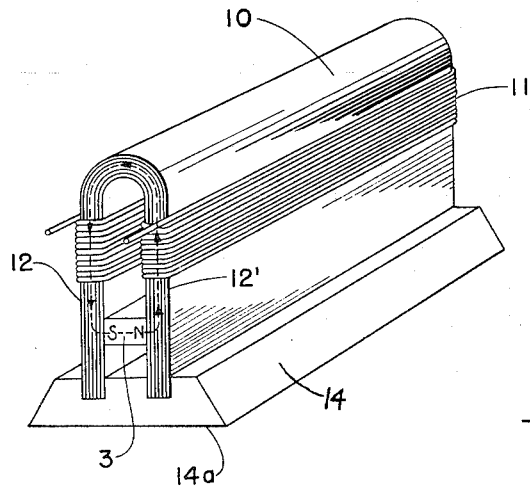

Dec. 25, 1945.  F. P. BUNDY  2,391,678

MAGNETOSTRICTION TRANSDUCER

Filed Aug. 29, 1945

Inventor
FRANCIS P. BUNDY
By
Attorney

Patented Dec. 25, 1945

2,391,678

UNITED STATES PATENT OFFICE 2,391,678

MAGNETOSTRICTION TRANSDUCER

Francis P. Bundy, Medford, Mass., assignor to the United States of America, as represented by the Secretary of the Navy Application August 29, 1945, Serial No. 613,351

5 Claims. (Cl. 177—386)

This invention relates to transducers of the magnetostrictive type which are utilized for converting electrical energy into wave energy and vice versa. These transducers are particularly adapted to underwater use in sending and receiving compressional wave energy for establishing the location of underwater targets.

All transducers which operate on the principle of magnetostriction require a polarized magnetic flux. One way in which this flux may be established is by passing a component of direct current through the windings which surround the magnetostrictive element in addition to the alternating current. However, this method of establishing the polarizing flux is not altogether satisfactory because of the inconvenience in making connections to transducers mounted on rotating shafts and the like, loss of power, heating effects in the windings, and the inconvenience of providing the direct current power source itself.

Another means of providing the polarizing flux is through the use of permanent magnets and it is to this type that the present invention is directed. In present known devices of the latter type, a permanent magnet is placed adjacent the magnetostrictive material in order that the polarized magnetic flux may flow through the material. The air gap between the material and magnet is made as narrow as possible in order to reduce the reluctance of the polarizing magnetic flux path. However, since in operation, the magnetostrictive material alternately expands and contracts with alternations in the alternating current source, it is evident that the air gap cannot be made too narrow. Otherwise, motion of the magnetostrictive material would cause it to strike the magnet and prevent satisfactory operation of the transducer. Accordingly, it has been necessary to provide an air gap of substantial width with the result that the reluctance of the polarizing flux path is comparatively high.

It is the primary object of this invention to provide a novel transducer construction in which the permanent magnet is bonded directly to the magnetostrictive material. The reluctance of the polarizing magnetic flux path is thereby reduced to an inconsequential amount since it is completely closed through the magnetostrictive material.

A more specific object is to provide a transducer of the magnetostrictive type which comprises a U shaped core or stack of laminations of magnetostriction material such as nickel with a winding surrounding at least one of the legs of the core. A permanent magnet extends between, and is bonded to, the legs near their ends and the latter are embedded or otherwise secured to a diaphragm member which is in acoustic contact with the transmitting medium.

Figure 2:
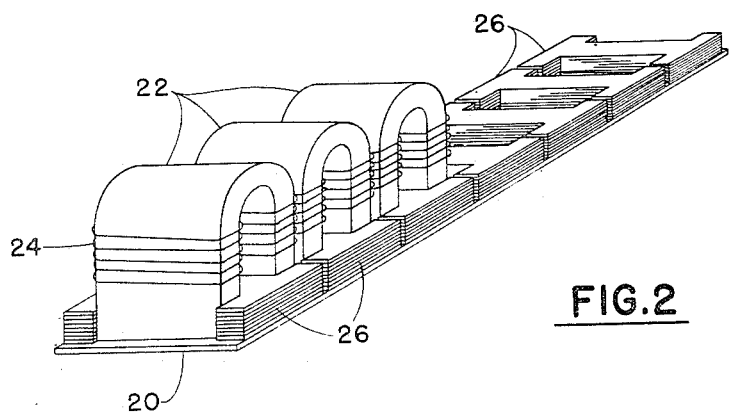

These and other objects of the invention will become more apparent from the detailed description to follow and from the accompanying drawing, in which Fig. 1 is a perspective of one embodiment of the invention, and Fig. 2 is a perspective view of a modification.

Referring now to the drawing, the core of the transducer is made up of a stack of laminations 10 of magnetostrictive material, preferably nickel, which has been annealed in air atmosphere for about 30 minutes at a temperature of about 1000 degrees C. As seen from the drawing, these laminations have a generally horseshoe, or U, shape and may be assembled together by applying cement between them and then subjecting the assembly to heat and pressure. One suitable cementing process is as follows: The surface of the laminations are cleaned so as to be clear of any grease or oils. A coat of "Vinylseal" which is a trade name for a resin base cement is brushed or sprayed on the several laminations, allowed to dry in air, and then baked at 250 degrees F. for a few minutes. The laminations are then assembled in their proper relation, clamped together in a press or jig, and heated to 300 degrees F. for a long enough time to be thoroughly heated through to this temperature. The presses are kept tight during this heating. After cooling, the pressure is removed and the process is complete.

A winding 11, preformed into a coil if desired, surrounds at least one and preferably both legs 12 and 12' of the magnetostrictive core 10 and is adapted to be connected to a source of alternating current, not shown.

For establishing the polarizing flux, a permanent magnet 3, preferably made from material sold under the trade names of "Alnico" or "Cunico," extends between the legs 12 and 12' of the magnetostrictive core near the open end of the U and is bonded securely to each leg such as by cementing. If desired, the magnet 3 is cemented in place with the same process and at the same time that the laminations 10 are assembled.

The ends of the legs 12 and 12' are each embedded in suitably sized recesses in a diaphragm member 14 which is preferably made of brass or other non-magnetic material to prevent the magnetic flux from magnet 3 from shunting across the open ends of the U instead of passing up and around the closed end of the U which is the desired path.

It will thus be evident that with the construction described, the path for the polarizing flux is completely closed through legs 12 and 12' of the magnetostrictive core and is in a direction indicated by the broken lines.

Thus when alternating current is impressed upon the coil 11, the core legs 12 and 12' expand and contract along the direction of the arrows which effects similar motion of the diaphragm 14 and of the acoustic transmitting medium in contact with the bottom face 14a of the diaphragm.

In the modified form shown in Fig. 2 a diaphragm 20 is energized by a series of U-shaped laminated nickel stacks 22 around which are disposed energizing windings 24 which carry the alternating current. The stacks 22 are fixed to the diaphragm 20 in the same manner as the legs 12 and 12' in the form shown in Fig. 1. This bond can be made by soldering or even by a satisfactory press fit.

Polarizing flux is provided by H-shaped stacks of laminated magnetic material 26 one of which is provided for each of the laminated nickel stacks 22. An alloy of copper-nickel-cobalt has been found satisfactory for the polarizing magnets. As in Fig. 1 the magnets may be bonded to the nickel stacks 22 although in this form the bonding step may be omitted.

If desired all of the magnets 26 may be made from a single stack of laminations of the copper-nickel-cobalt alloy simply by punching recesses for the reception of the ends of the U-shaped nickel stacks 22. However, in practice, it has been found more satisfactory to utilize H-shaped magnetic elements, one for each nickel stack, since the manufacture of the entire transducer is thus facilitated.

The resulting elongated, rectangular diaphragm carrying the magnetostrictive elements 10 or 22 may advantageously be used as a part of a circular transducer made up of a plurality of the elongated, rectangular elements placed with their axes parallel to the axis of the cylinder.

In conclusion it is desired to point out that while the two embodiments shown and described are to be preferred, various changes in the construction and arrangement of the parts may be made without departing from the spirit and scope of the invention as defined by the appended claims.

Having thus fully described this invention, I claim:

1. A transducer comprising a generally U-shaped core of laminations of magnetostrictive material, a winding on at least one leg of said core adapted to be energized with alternating current, and permanent magnet means for establishing a polarizing magnetic flux through said core, said magnet means extending between the legs of said core and being bonded thereto.

2. A transducer comprising a generally U-shaped core of laminations of magnetostrictive material, a winding on at least one leg of said core adapted to be energized with alternating current, and permanent magnet means for establishing a polarizing magnetic flux through said core, said magnet means extending between the legs of said core near the open side of the U and being bonded to said core legs.

3. A transducer comprising a generally U-shaped core of laminations of magnetostrictive material, a winding on at least one leg of said core adapted to be energized with alternating current, permanent magnet means for establishing a polarizing magnetic flux through said core, said magnet means extending between the legs of said core near the open end of the U and being bonded to said core legs, and a diaphragm member secured to the ends of said core legs, sad diaphragm being of non-magnetic material.

4. A transducer comprising a plurality of generally U-shaped cores of laminations of magnetostrictive material, a winding on at least one leg of each of said cores adapted to be energized with alternating current, permanent magnet means for establishing a polarizing flux through said cores, and an elongated common diaphragm actuated by all of said U-shaped cores.

5. A transducer including a generally U-shaped core of laminations of magnetostrictive material, a winding on at least one leg of said core adapted to be energized with alternating current, a diaphragm actuated by said core, and permanent magnet means for establishing a polarizing magnetic flux through said core, said magnet means extending between the legs of said core.

FRANCIS P. BUNDY.